US011468435B1

(12) United States Patent
Cheng et al.

(10) Patent No.: US 11,468,435 B1
(45) Date of Patent: Oct. 11, 2022

(54) APPARATUS AND METHODS OF AIR-GAPPED CRYPTO STORAGE USING DIODES

(71) Applicant: Blockchain Innovation, LLC, Fort Worth, TX (US)

(72) Inventors: Liang Cheng, Los Altos, CA (US); Atul Patil, Indore (IN); Austin Trombley, San Francisco, CA (US)

(73) Assignee: Blockchain Innovation, LLC, Forth Worth, TX (US)

( * ) Notice: Subject to any disclaimer, the term of this patent is extended or adjusted under 35 U.S.C. 154(b) by 92 days.

(21) Appl. No.: 16/857,141

(22) Filed: Apr. 23, 2020

Related U.S. Application Data

(63) Continuation-in-part of application No. 16/733,045, filed on Jan. 2, 2020.

(Continued)

(51) Int. Cl.
*H04L 9/32* (2006.01)
*G06Q 20/36* (2012.01)
(Continued)

(52) U.S. Cl.
CPC ..... *G06Q 20/3674* (2013.01); *G06F 16/2379* (2019.01); *G06N 5/04* (2013.01);
(Continued)

(58) Field of Classification Search
CPC ............... G06Q 20/3674; G06Q 20/29; G06Q 20/3825; G06Q 20/3829; G06Q 20/401;
(Continued)

(56) References Cited

U.S. PATENT DOCUMENTS 3,755,798 A * 8/1973 Aguirre ............... G11B 20/1419
10,063,372 B1 * 8/2018 Chiu ..................... H04L 9/0894
(Continued)

FOREIGN PATENT DOCUMENTS

CA       2775693 A1 * 11/2012 ............. H04L 29/06
CN    107785044 A  *  3/2018 .......... G06F 11/1048

*Primary Examiner* — Darshan I Dhruv
(74) *Attorney, Agent, or Firm* — Nelson Bumgardner Conroy P.C.; Carder W. Brooks; Brent N. Bumgardner (57) ABSTRACT

In a blockchain network, a "cold wallet" allows users to securely create and store their private key and sign their transaction data only when the wallet is completely offline. When a user requests a transaction, a user key tag that identifies the user's key is determined. The transaction data and the user's key tag are transmitted to a cold wallet that includes an HSM Trusted Client and an HSM over a first one-way communication channel during a window in a first sequence of connection windows. Inside the cold wallet, the HSM Trusted Client uses the user key tag to determine an encrypted version of the user's signing key. During a processing window, the transaction data and encrypted signing key are transmitted to the HSM, where a cleartext key is recovered and used to sign the transaction, and the signed transaction is transmitted back to the HSM Trusted Client. During a second connection window, the signed transaction is transmitted from the HSM Trusted Client for transmission to the blockchain network. The processing and connection windows do not overlap. The one-way communication paths combined with the non-overlapping connection and processing prevent unauthorized access to the signing keys.

36 Claims, 6 Drawing Sheets

Related U.S. Application Data (60) Provisional application No. 62/966,969, filed on Jan. 28, 2020, provisional application No. 62/788,012, filed on Jan. 3, 2019.

(51) Int. Cl.

| | | |
|---|---|---|
| *H04L 9/06* | (2006.01) | |
| *G06F 16/23* | (2019.01) | |
| *H04L 9/08* | (2006.01) | |
| *G06Q 20/38* | (2012.01) | |
| *G06Q 20/40* | (2012.01) | |
| *G06Q 20/22* | (2012.01) | |
| *G06N 20/00* | (2019.01) | |
| *G06N 5/04* | (2006.01) | |
| *G06Q 50/26* | (2012.01) | |
| *H04L 9/00* | (2022.01) | |

(52) U.S. Cl.
CPC ............ *G06N 20/00* (2019.01); *G06Q 20/29* (2013.01); *G06Q 20/3825* (2013.01); *G06Q 20/3829* (2013.01); *G06Q 20/401* (2013.01); *H04L 9/0637* (2013.01); *H04L 9/0827* (2013.01); *H04L 9/0891* (2013.01); *H04L 9/3247* (2013.01); *G06Q 50/265* (2013.01); *G06Q 2220/00* (2013.01); *H04L 9/50* (2022.05); *H04L 2209/56* (2013.01)

(58) Field of Classification Search
CPC ............ G06Q 50/265; G06Q 2220/00; G06F 16/2379; G06N 20/00; G06N 5/04; H04L 9/0637; H04L 9/0827; H04L 9/0891; H04L 9/3247; H04L 2209/38; H04L 2209/56

See application file for complete search history.

(56) References Cited

U.S. PATENT DOCUMENTS

| | | | | |
|---|---|---|---|---|
| 10,068,228 | B1* | 9/2018 | Winklevoss | H04L 9/3239 |
| 11,139,955 | B1* | 10/2021 | So | G06Q 20/3674 |
| 11,184,157 | B1* | 11/2021 | Gueron | H04L 9/14 |
| 2002/0001395 | A1* | 1/2002 | Davis | G06F 21/10 |
| | | | | 704/E19.009 |
| 2012/0204032 | A1* | 8/2012 | Wilkins | H04L 63/0428 |
| | | | | 713/170 |
| 2012/0324230 | A1* | 12/2012 | Osborne | H04L 9/3247 |
| | | | | 713/176 |
| 2016/0292672 | A1* | 10/2016 | Fay | G06Q 20/363 |
| 2017/0041296 | A1* | 2/2017 | Ford | G06F 21/64 |
| 2018/0069713 | A1* | 3/2018 | Liu | H02J 1/00 |
| 2018/0157841 | A1* | 6/2018 | Shin | G06F 21/44 |
| 2018/0198627 | A1* | 7/2018 | Mullins | H04L 9/3066 |
| 2018/0268401 | A1* | 9/2018 | Ortiz | G06Q 20/326 |
| 2018/0367311 | A1* | 12/2018 | Stahlberg | H04L 9/3234 |
| 2018/0367316 | A1* | 12/2018 | Cheng | H04L 9/3234 |
| 2019/0005284 | A1* | 1/2019 | Hueber | H04B 5/0031 |
| 2019/0227114 | A1* | 7/2019 | Aschauer | G01D 3/08 |
| 2019/0318356 | A1* | 10/2019 | Martin | H04L 9/0637 |
| 2019/0342084 | A1* | 11/2019 | Mehedy | H04L 9/0825 |
| 2019/0354970 | A1* | 11/2019 | Di Iorio | H04L 9/0869 |
| 2019/0378119 | A1* | 12/2019 | Hyuga | G06Q 20/0655 |
| 2020/0028675 | A1* | 1/2020 | Gancarz | G06Q 20/02 |
| 2020/0044863 | A1* | 2/2020 | Yadlin | H04L 9/3247 |
| 2020/0175179 | A1* | 6/2020 | Iyer | G06F 21/602 |
| 2021/0211197 | A1* | 7/2021 | Yutaka | H01L 31/02327 |

\* cited by examiner

APPARATUS AND METHODS OF AIR-GAPPED CRYPTO STORAGE USING DIODES

RELATED APPLICATION(S)

This application claims priority under 35 U.S.C. § 119(e) of the U.S. Provisional Patent Application Ser. No. 62/966,969, filed Jan. 28, 2020, and titled "System and Method of an Air-Gapped Crypto Storage System Using Diode and Remote Controlled Storage of Digital Assets Using Near Field Communication Tags," which is hereby incorporated by reference in its entirety. This application also claims priority of the co-pending U.S. patent application Ser. No. 16/733,045, filed Jan. 2, 2020, and titled "Apparatus and Methods for Remote Controlled Cold Storage of Digital Assets Using Near Field Communication Tags," which claims priority under 35 U.S.C. § 119(e) of U.S. Provisional Patent Application Ser. No. 62/788,012, filed Jan. 3, 2019, and titled "Apparatus and a Method for Remote Controlled Cold Storage of Digital Assets Using Near Field Communication (NFC) Tags," both of which are also hereby incorporated by reference in their entireties.

FIELD OF THE INVENTION

This invention is related to protecting digital assets accessible over computer networks. More specifically, this invention is related to protecting digital assets on a blockchain system by isolating digital wallets from Internet-based attacks.

BACKGROUND OF THE INVENTION

Online asset transactions, such as banking withdrawals, title transfers, and supply chain management, typically involve a central bank, title company, or other central institution. These transactions are prone to attack and inefficiencies, such as cyberattack at the central location, fraud, delays in settling accounts, high transaction fees, limited transparency, and difficulty in having a single entity monitoring and thus detecting errors. Many of these disadvantages are overcome using blockchain technology.

A blockchain network is a peer-to-peer network where each node involved is coupled to one another. A blockchain network does not require a central authority or trusted intermediaries to authenticate or to settle transactions or control the underlying infrastructure. Examples of popular blockchain platforms include Ethereum® and Bitcoin™.

A blockchain network includes a distributed data structure that includes an ordered chain of blocks coupled to a ledger. Each block stores a hash of its contents, timestamped copies of recent valid transactions, and a hash of the previous block. This ordered relationship ensures that blocks cannot be inserted into or deleted from the chain by a malicious actor. When used in cryptocurrency applications, such as Bitcoin™, the blockchain network also records the balances of digital wallets that are each associated with a user account.

For a transaction to be considered valid, a threshold number of nodes (a quorum) must agree on the transaction. Typically, the quorum is at least 51% of the participating nodes.

Ownership of digital assets in a blockchain network is established through a pair of cryptographic keys: a public key and a private key. Both the keys together are stored in a user's wallet (also referred to as a digital wallet). The private key is used to sign messages/authorize transactions. The public key is used to identify the payer for receiving transactions. The private key must be kept secret by the user at all times because revealing it is equivalent to giving ownership of digital assets. Hence the security of digital wallets is critical for blockchain networks.

A digital wallet can be classified into two main categories: Hot, which is coupled to the Internet, and Cold, which is not coupled to the Internet. In other words, a cold wallet is completely offline. In this environment, a signing key is stored offline and transactions are signed offline with the key. Hot wallets are generally associated with everyday usage on desktops and mobile phones. Cold wallets are created for long-term storage of larger amounts of crypto coins. Even though hot wallets are more convenient, they generally come at the risk of losing all the funds to hackers because the keys can be exposed online. The Bitcoin history is full of such cases. Since 2013, more than $15 billion USD were lost due to hacking. Since then, the exchanges have increased their security measures, managing most of their funds in cold storage (approximately 90%) and the rest in a hot wallet to enable daily transactions.

Despite holding a majority of its funds in cold storage, exchanges still fall under the category of hot wallets and attackers keep discovering new ways to breach systems. In 2018 alone, a total of $787 million USD was stolen from four major exchanges (CoinCheck, BitGrail, Coinrail, Zaif).

For protection, the private keys are often stored in a Hardware Security Module (HSM). In addition to storing keys, HSMs can perform other functions, such as generating keys, encrypting data, and digitally signing data. Because HSMs are typically coupled to a network using Transmission Control Protocol/Internet Protocol (TCP/IP) or other Internet protocols, which are vulnerable to hackers, these keys are prone to theft, allowing a malicious party to access data on the HSM. Typically, bad actors hack into an HSM through its HSM Trusted Client, generally the only gateway to and from the HSM.

There is a need to protect the private keys in a blockchain network when the system is connected to the Internet.

SUMMARY OF THE INVENTION

In a blockchain network, a cold wallet refers to offline storage of a private key used to sign transactions in an offline environment. That is, the private key does not come into contact with a server connected online during the signing process, thereby enhancing security. To achieve strict cold offline key storage, a key is loaded to an HSM only when it is needed. The key will be deleted after the signing. To achieve the offline key signing, the HSM is disconnected from the network during the signing. To protect the HSM and its trusted client from being hacked, the HSM is unidirectionally connected to the network where the key signing request is sent.

In accordance with the principles of the invention, the key storage device (e.g., the HSM) with key-related content is unidirectionally connected to a Push Server, from which the HSM receives data, and to a Pull Server, through which the HSM transmits data to the blockchain network. Because all two-way interactive network protocols (e.g., TCP, the de-facto Internet protocol) are physically disabled, an Internet based malicious actor can never take control of the HSM and its HSM Trusted Client, which stores signing keys. As additional security, a synchronized "pulse" mechanism between the wallet (containing the HSM and its HSM Trusted Client) and both the Push Server and the Pull Server ensures that the signing of transaction data within the HSM only occurs when the wallet is "offline." Essentially, the pulse mechanism provides synchronized pulses between the Wallet and the Push Server, the Pull Server and the HSM. In this way, during the entire lifecycle of a transaction, due to the diode or similarly functioning network topology (e.g., a one-way system for allowing data to be transferred over a path in only one direction), no TCP network protocol is allowed to access the HSM.

Without TCP, a remote hacker from the Internet will never be able to take remote control of the HSM across the Internet. Since the cleartext private key only exists inside the wallet (i.e., HSM) boundary, it is extremely difficult to break the HSM boundary and fetch the cleartext key even if the malicious actor has physical access to the HSM in the on-premises/public data center.

Preferably, the encrypted private key and the data to sign are first loaded to the wallet boundary via a diode path and then the connectivity from the wallet to the Push server is disconnected. The signing process occurs inside the wallet boundary. Preferably, after the signing process, the private key is erased from the HSM. Finally, the diode path to the Pull Server is restored and the signed data is pulled from the Pull Server.

Embodiments of the invention have advantages over the traditional "cold wallet" approach, where the signing key is always sealed inside a device. Cold storage ("cold wallets") means generating and storing crypto coins private keys in an offline environment, that is, away from the Internet. In contrast to the traditional approach, embodiments of the invention allow for the private key to exist in cleartext for much shorter periods in the HSM, such as only when the key is required to sign. At all other times, the private key is stored encrypted and inside the logical cryptographic boundary.

Embodiments of the invention provide additional security by requiring a quorum authorization scheme such as "multisig," which ensures that the misuse of one single private key cannot lead to an authorized transaction. In different embodiments, the required quorum private keys for one account are stored in different areas and with a hybrid cloud of HSM service providers, in addition to the on-premises HSM deployment described above. In this way, keys required for one quorum are never in one area or available to one HSM service provider/vendor. One malicious actor, especially a rogue insider with operation permission to one HSM service in one area, can never be able to simultaneously "misuse" all quorum authorization required private keys located in different areas and by different HSM vendors.

In a first aspect of the invention, a method of signing transaction data within a digital wallet, wherein the digital wallet comprises a hardware security module (HSM) Trusted client coupled to an HSM, includes transmitting transaction data corresponding to a transaction and an encrypted key to the HSM Trusted Client over a first one-way transmission path; processing the transaction data within the digital wallet including: transmitting the transaction data and the encrypted key from the HSM Trusted Client to the HSM along a two-way transmission path; inside the HSM, using the encrypted key to recover a signing key and signing the transaction data with the signing key to generate a signed transaction; and transmitting the signed transaction from the HSM to the HSM Trusted Client along the two-way transmission path; and transmitting the signed transaction from the HSM Trusted Client over a second one-way transmission path for transmission to a blockchain network, wherein data can only be transmitted between the Internet and the digital wallet over the first and second one-way transmission paths, and none of transmitting data along the first one-way transmission path, processing data within the digital wallet, and transmitting data along the second one-way transmission path overlap.

In one embodiment, transmitting data along the first one-way transmission path occurs only during a window in a first sequence of windows, processing data inside the digital wallet occurs only during a window in a second sequence of windows, and transmitting data along the second one-way transmission path occurs only during a window in a third sequence of windows, wherein none of the windows in the first, second, and third sequence of windows overlap. Preferably, each of the first, second, and third sequence of windows comprises a corresponding pulse train. In one embodiment, in each of the pulse trains the windows have a constant width and the period is constant. Alternatively, at least some of the windows in the pulse trains have varying widths, at least some of the pulse trains have varying periods, or both.

In one embodiment, transmitting data over the first and second transmission paths is according to a one-way transmission protocol, such as user datagram protocol (UDP), a serial communication protocol, near-field communication protocol, an optical-signal protocol, an ultrasonic signal protocol, a steganographic protocol, or any combination thereof. In one embodiment, at least a portion of both the first and second transmission paths is sound insulated, light shielded, magnetically shielded, or a combination thereof.

In one embodiment, the method also includes receiving a request for the transaction from a user; associating the user with a key tag identifying the key; transmitting the transaction data and the key tag to the digital wallet over the first transmission path; and inside the digital wallet, using the key tag to determine an encryption of the key, an encrypted key. In one embodiment, the mapping between the key tag and the encryption key is periodically updated.

Preferably, the method also includes decrypting the encrypted key within the HSM to recover the signing key for signing the transaction data.

In one embodiment, the method also includes, after signing the transaction with the signing key, deleting the signing key within the HSM within a period based on a profile for the user and one or more characteristics of the transaction. The one or more characteristics include an amount of the transaction and a period during which the user has requested transactions for amounts within a predetermined range. Preferably, deletion is determined by machine learning.

In one embodiment, the key tag includes a hash of the encrypted key. Alternatively, the key tag includes an index into a table mapping the key tag to the encrypted key.

Preferably, data is transmitted over the first and second transmission paths according to transport layer security (TLS) protocol.

In one embodiment, the method also includes authenticating the transaction before transmitting the transaction data to the digital wallet. As one example, authenticating the transaction includes receiving signatures for the transaction from at least a quorum of users on the blockchain network.

In one embodiment, the transaction is one of multiple transactions each having corresponding transaction data. At least two of the multiple transaction data are transmitted over the first one-way transmission path together, at least two of the multiple signed transactions are transmitted over the second one-way transmission path together, or both.

Preferably, at least two of the multiple transaction data are processed in a batch, when the first and second one-way transmission paths are disconnected.

In a second aspect of the invention, a system for securely signing transactions for transmission over a blockchain network includes a digital wallet including an HSM Trusted Client coupled to an HSM. The HSM is configured to sign a transaction. The digital wallet is configured to process transaction data corresponding to the transaction, wherein processing transaction data includes transmitting the transaction data and an encrypted key from the HSM Trusted Client to the HSM; inside the HSM, using the encrypted key to recover a signing key and signing the transaction data with the signing key to generate a signed transaction; and transmitting the signed transaction from the HSM to the HSM Trusted Client. The system also includes a first transmission module providing one-way transmission for the transaction data and a key tag corresponding to the encrypted key, to the HSM Trusted Client; and a second transmission module providing one-way transmission for the signed transaction from the HSM Trusted for later distribution to the blockchain network. The digital wallet is configured to receive data from the Internet only over the first transmission module and to transmit data to the blockchain network only over the second transmission module. No overlap occurs between any of transmitting data along the first one-way transmission path, processing transaction data, and transmitting data along the second one-way transmission path.

In one embodiment, the system also includes a windows generator for generating non-overlapping windows during which the processing inside the digital wallet, and the data transmission over the first and second one-way transmission paths occur.

Preferably, the system also includes an orchestration server; a user key tag database mapping users to corresponding key tags, wherein each of the user key tags uniquely identifies a user key; a push server coupling the orchestration server to the first transmission module; and a pull server coupling the second transmission module to the orchestration server. The orchestration server transmits transaction data and corresponding user key tags to the push server, receives signed transactions from the pull server, and transmits the signed transactions to the blockchain network. Preferably, the orchestration server exchanges data with the push server and the pull server according to transport layer security protocol.

In one embodiment, the first and second transmission modules include, respectively, first and second diode elements. In other embodiments, the first and second transmission modules include first and second light source-photodiode pairs, first and second NFC read/write pairs, first and second ultrasonic speaker/microphone pairs, or any combination thereof. Preferably, the first and second transmission modules each includes a shielded air gap over which data is transmitted.

Preferably, data is transmitted from the push server to the HSM Trusted Client and from the HSM Trusted Client to the pull server according to a one-way transmission protocol, such as user datagram protocol, NFC protocol, an optical signal protocol, an ultrasonic protocol, or any combination thereof. In another embodiment, the first and second transmission modules each includes a steganographic embedder/extractor.

Preferably, the digital wallet also includes an encrypted key database that maps key tags to associated encrypted keys. In one embodiment, each of the keys tags in the encrypted key database includes a hash of its associated encrypted key.

In one embodiment, the system also includes multi-authentication logic coupled to the orchestration server. The multi-authentication logic is configured to authenticate a transaction from a user using signatures from multiple users.

Preferably, the orchestration server is further coupled to a cloud HSM.

In one embodiment, the HSM Trusted Client is configured to queue multiple transaction requests each corresponding to a transaction data. Preferably, the HSM is configured to process the multiple transaction requests as a batch.

DETAILED DESCRIPTION OF THE INVENTION

In a blockchain network, a "cold wallet" allows users to securely create and store their private key and sign their transaction data only when the wallet is completely offline. In contrast to existing cold wallets, which are typically implemented as a single-tenancy device at the client side, embodiments of the invention allow secure private key storage with multi-tenancy and can be deployed at an on-premise data center. A one-way diode data path and a synchronized "pulse" mechanism in accordance with embodiments of the invention ensure 1) a cold wallet can never be hijacked by an Internet malicious actor because the de facto Internet protocol (TCP) and other interactive protocols are physically disabled at all times; 2) the private key signing process can only occur when the cold wallet is completely offline; 3) the key exists in the HSM only when the HSM is offline, that is, the key can always be offline; and 4) high performance.

Figure 1:
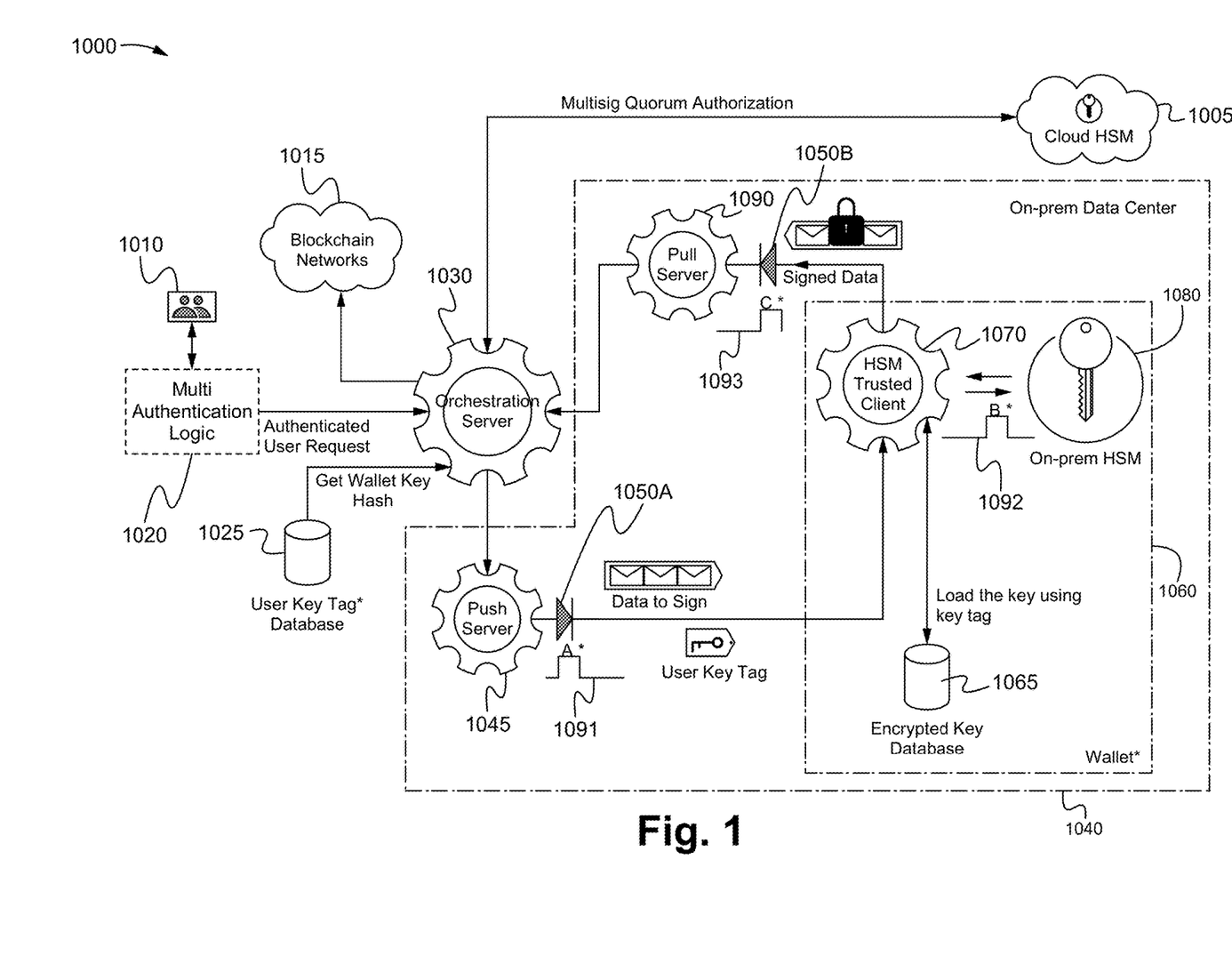
FIG. 1 is a high-level diagram of a system for securely creating and storing private keys for signing transaction data for transmission over a blockchain network in accordance with one embodiment of the invention.

FIG. 1 shows a schematic diagram of a system 1000 in accordance with one embodiment of the invention. The system 1000 includes an Orchestration Server 1030 coupling a cloud of hardware security modules (HSMs) 1005, blockchain networks 1015, multi-authentication logic 1020, a User Key-Tag database 1025, and an on-premises Data Center 1040. Among other things, the Orchestration Server 1030 queues transaction data and associated key-tags for transmission to the Data Center 1040. The Data Center 1040 includes a Push Server 1045 coupled to the Orchestration Server 1030, a first diode 1050A for one-way transmission from the Orchestration Server 1030 to a wallet 1040, a second diode 1090 for one-way transmission from the wallet 1040 to a Pull Server 1090 coupled to the Orchestration Server 1030.

The wallet 1060 includes an HSM Trusted Client 1070 coupled to an Encrypted Key Database 1065 and an on-premises HSM 1080. The HSM Trusted Client 1070 is coupled to the Push Server 1045 over the first diode 1050A and to the Pull Server over the second diode 1050B. Preferably, all the components of the Data Center 1040 are collocated on the same premises.

Preferably, the transmissions from the Orchestration Server 1030 to the Push Server 1045 and from the Pull Server 1090 to the Orchestration Server 1030 are both according to Transport Layer Security (TLS) protocol. Preferably, transmissions from the Push Server 1045 to the first diode 1050A and from the second diode 1050B to the Pull Server 1090 are both according to user datagram protocol (UDP). In other embodiments protocols other than UDP and TLS are contemplated.

The first diode 1050A allows data to be transmitted from the Push Server 1045 to the HSM Trusted Client 1070 but prevents data from being transmitted in the opposite direction, from the HSM Trusted Client 1070 to the Push Server 1045. Similarly, the second diode 1050B allows data to be transmitted from the HSM Trusted Client 1070 to the Pull Server 1090 but prevents data from being transmitted from the Pull Server 1090 to the HSM Trusted Client 1070. In this way, the first diode 1050A and the second diode 1050B provide one-way transmission paths.

Preferably the first and second diodes 1050A and 1050B are fast-switching diodes, such as insulated-gate bipolar transistor (IGBT) diodes, though other suitable diodes can also be used.

Preferably, the only data path from the Internet to the Wallet 1060 is from the Push Server 1045 through the first diode 1050A to the HSM Trusted Client 1070, and the only data path from the Wallet 1060 to the Internet is from the HSM Trusted Client 1070 through the second diode 1050B to the Pull Server 1090. Preferably, the only data path to the on-premises HSM 1080 is through the HSM Trusted Client 1070.

As explained in more detail below, the first diode 1050A transmits data only when it is turned ON, such as by being energized, thereby connecting the Push Server 1045 to the HSM Trusted Client 1070, allowing data to be transmitted from the Push Server 1045 to the HSM Trusted Client 1070. (This is also referred to as providing "connectivity" between the Push Server 1045 and the HSM Trusted Client 1070.) When the first diode 1050A is turned OFF, the Push Server 1045 cannot transmit data to the HSM Trusted Client 1070. FIG. 1 shows a segment of a pulse train 1091 for turning the first diode 1050A ON during a window A and OFF otherwise. Typically, the first diode 1050A will be turned ON (indicated by the sequences labeled "A") and OFF sequentially, as shown in more detail in FIG. 2A, which shows a longer portion of the pulse train 1091.

Figure 2A:
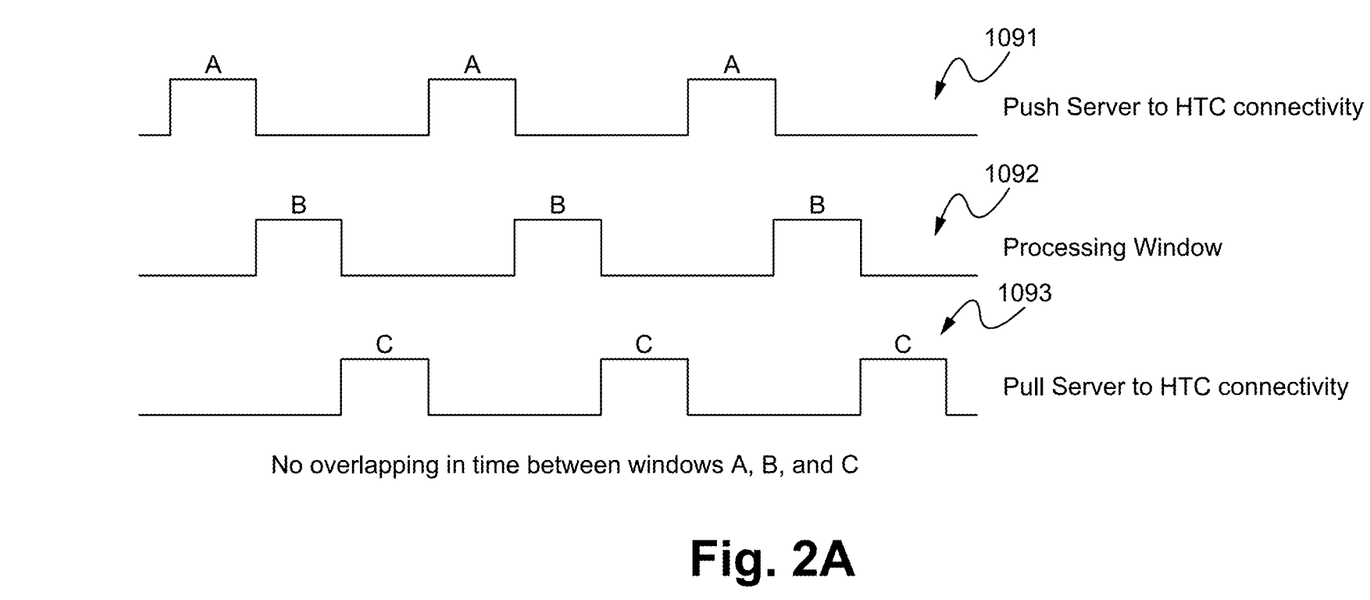
FIGS. 2A-B show windows (pulse trains) for transmitting or processing data such as transaction data and key tags in accordance with one embodiment of the invention.

In a similar manner, the HSM Trusted Client 1070 is connected to the HSM 1080 only during a window B ("processing windows") of a pulse train 1092. Again, FIG. 2A shows a longer portion of the pulse train 1092. Referring to FIG. 2A, connectivity between the HSM Trusted Client 1070 occurs during each window B in the pulse train 1092. Preferably, only during a single window B (that is, not extending over multiple windows B), transaction data and a user's encrypted signing key can be transmitted from the HSM Trusted Client 1070 to the HSM 1080, the HSM 1080 recovers the cleartext signing key and uses it to sign the transaction data, and the signed transaction data is transmitted from the HSM 1080 to the HSM Trusted Client 1070.

Finally, in a similar manner, the pulse train 1093 includes a window C from a sequence of connection windows in a pulse train 1093 during which data can be transmitted over the second diode 1050B from the HSM Trusted Client 1070 to the Pull Server 1090. Data cannot be transmitted from the HSM Trusted Client 1070 over the second diode 1050B, and to the Pull Server 1090 outside any of the windows C. Again, FIG. 2A shows a longer portion of the pulse train 1093.

Preferably, none of the windows A, B, and C overlap with each other. In other words, none of the separate windows A overlap with any of the windows B and C, and none of the windows B and C overlap with each other.

In some embodiments of the invention, the system 1000 is configured as a "pipeline" structure to increase throughput. Referring to FIGS. 1 and 2A, in accordance with these embodiments, transaction data for multiple transactions are transmitted over the first one-way transmission path during a window A and queued on the HSM Trusted Client 1070 as a batch of "sign requests." During a window B, the multiple sign requests, each including transaction data and a corresponding wrapped/encrypted signing key or signing key identification, are pushed from the HSM Trusted Client 1070 to the HSM 1080. During further processing, for each transaction, a cleartext key is recovered inside the HSM 1080 and the transaction data signed to generate a signed transaction, which is then transmitted to and stored at the HSM Trusted Client 1070. Next, during a window C, the multiple signed transactions are transmitted from the HSM Trusted Client 1070, as a batch (e.g., together), over the second diode 1050B, to the blockchain network 1015. In these embodiments, to ensure that the signing keys are kept offline, the window A can overlap with the window C, but the window B cannot overlap with the windows A or C.

In yet another pipeline structure in accordance with embodiments of the invention, transaction data are transmitted to and from the HSM Trusted Client 1070 in discrete windows, but again queued on the HSM Trusted Client 1070 as a batch of sign requests for processing on the HSM 1080. To simplify the discussion, referring to FIGS. 1 and 2A, the transmission of transaction data for a transaction X over the first diode 1050A to the wallet 1040 (e.g., during a window A) is referred to as $A_X$, the processing of a transaction Y within the wallet 1040 (e.g., during a window B) is referred to as $B_Y$, and the transmission of a signed transaction Z from the wallet 1040 across the second diode 1050B to the blockchain network 1015 (e.g., during window C) is referred to as $C_Z$.

Preferably, any two or more of $A_X$, $A_Y$, $A_Z$, $C_X$, $C_Y$, and $C_Z$ can overlap. That is, transaction data and signed transactions can be transmitted to and from the wallet 1040 at the same time. Also, any two or more of $B_X$, $B_Y$, and $B_Z$ can overlap. However, to ensure that signing keys are never online in cleartext format, none of $B_X$, $B_Y$, or $B_Z$ can overlap with any of $A_X$, $A_Y$, $A_Z$, $C_X$, $C_Y$, and $C_Z$. That is, when transaction data is being processed in the wallet 1040, the first diode 1050A and the second diode 1050B are both OFF.

As one example, the HSM Trusted Client 1070, the HSM 1080, or both are configured with multiple processors functioning in parallel, or by a single processor configured for multitasking (e.g., using time slices), multithreading, or any combination of these, thereby allowing the wallet 1040 to process transactions in parallel.

In operation of these pipeline embodiments, a batch of transaction data each with a different key are queued in the HSM Trusted Client 1070. These sign requests can be pushed to the HSM 1080 sequentially or simultaneously, such as over parallel transmission lines, in an interleaved structure, or in a similar manner. Any one or more of the following can be performed for multiple transactions in parallel: recovering wrapped/encrypted keys for transactions in the HSM Trusted Client 1070, transmitting transaction data and the wrapped/encrypted keys from the HSM Trusted Client 1070 to the HSM 1080, recovering the cleartext signing keys in the HSM 1080, signing transactions within the HSM 1080 to generate signed transactions, and transmitting signed transactions from the HSM 1080 to the HSM Trusted Client 1070.

Figure 2B:
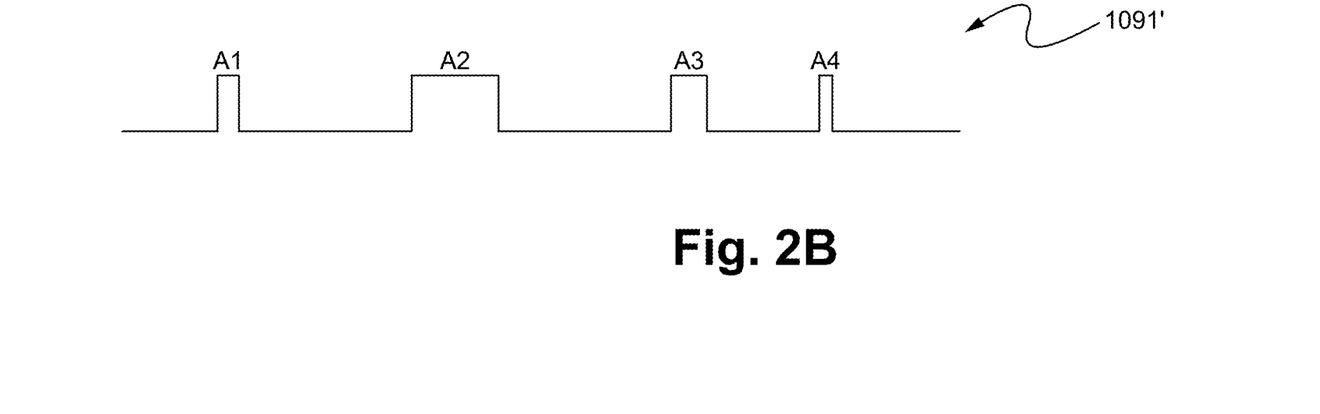

Referring to FIG. 1, it will be appreciated that while the timing diagrams 1091-1093 show positive pulses (e.g., a +5V input or other signal to the first diode 1050A), the windows A, B, and C can have negative (e.g., −5V) or other values to energize the diodes 1050A and 1050B and transmission paths to allow transmission of data. Also, while the pulse trains 1091-1093 all have constant periods and window widths, it will be appreciated that any of the windows A, B, and C in the sequences of windows can have varying widths, varying frequencies, or both, so long as none of the windows overlap. FIG. 2B, for example, shows a pulse train 1091' having windows of varying widths A1, A2, A3, A4, etc., and varying periods for energizing the first diode 1050A, in accordance with one embodiment of the invention. The windows B and C can have similar characteristics.

Figure 3A:
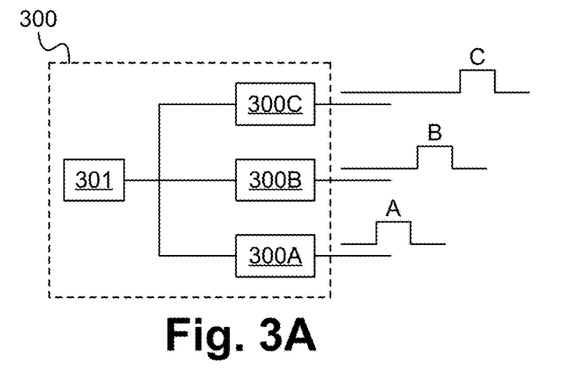
FIGS. 3A-C are block diagrams of window generators in accordance with embodiments of the invention.
Figure 3B:
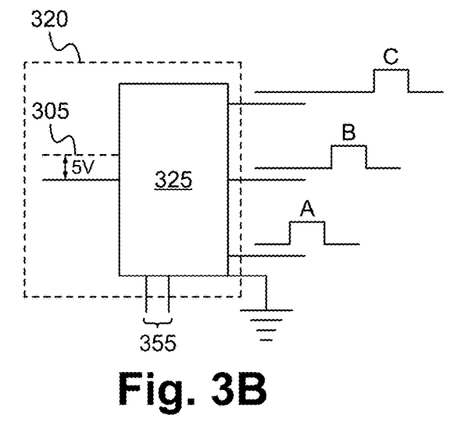
Figure 3C:
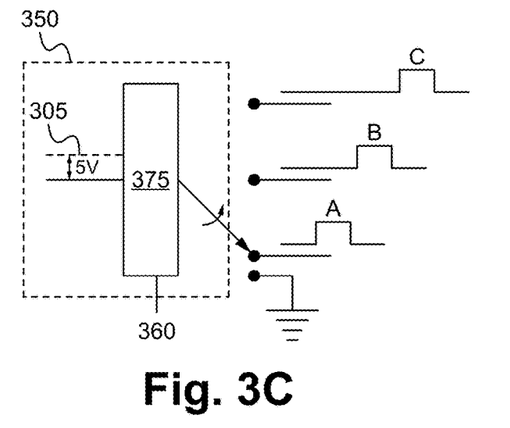

It will be appreciated that the windows A, B, and C can be generated in several ways, such as by pulse trains. (Because the windows A, B, and C can be generated by pulse trains, the terms "windows" and pulse trains" are used interchangeably.) FIGS. 3A-C show windows generators in accordance with embodiments of the invention. FIG. 3A shows clocks 300A, 300B, and 300C for generating windows (here, clock signals) A, B, and C, respectively. Referring to FIGS. 1 and 3A-C, preferably, the window A is coupled to the first diode 1050A (or functional equivalent, as described in the different embodiments), the window B is coupled to the HSM Trusted Client 1070/HSM 1080, and the window C is coupled to the second diode 1050B. The clocks 300A, 300B, and 300C are coupled to and synchronized with a central/master clock 301. FIG. 3B shows a windows generator 320 that includes a multiplexer 325 that receives a composite clock signal 305 (here, a +5 VDC signal) on its input line. Using the selectors 355, the composite signal 350 can be divided into windows A, B, and C, including a ground that that allows the signals A, B, and C to be non-contiguous. FIG. 3C shows a windows generator 350 that includes a 4-way (SP4T) switch 375 that receives the composite clock 305 as input and sequentially (rotationally) couples the input signal to separate lines for dividing the composite signal 305 to generate the windows A, B, and C. After reading this disclosure, those skilled in the art will recognize other ways of generating non-overlapping windows in accordance with embodiments of the invention.

As described in more detail below, a key tag is used to determine the user's signing key within a wallet for signing in an HSM. The key tag is an identification for the user key. It provides one-to-one mapping between a user and her actual private key. Referring to FIG. 1, in one embodiment, the user key-tag database 1025 associates the user's account identity with a key tag. At an Encrypted Key database inside a wallet (e.g., 1065), the user key tag is used to determine the encrypted user private key.

The private key cannot be derived from the key tag. In one embodiment, keys are periodically rotated, thereby constantly updating the associated key tags. In another embodiment, to ensure that the user-facing key tag is constant, the key-tag to encrypted key mapping is also periodically updated.

In different embodiments, a key tag can be a key index or a hash number calculated from an encrypted private key.

Key tags can be associated with particular keys for any predetermined length of time on the client side, reducing the "rekeying" process. Alternatively, clients are able to determine their own keys (referred to as "Bring Your Own Key," or BYOK), thereby allowing them to control the life cycle of their own keys. Alternatively, users are able to create their own key tags on the client side and store the key tags on a user device. After reading this disclosure, those skilled in the art will recognize other ways to store, generate, update, and associate keys and associated key tags.

Figure 4:
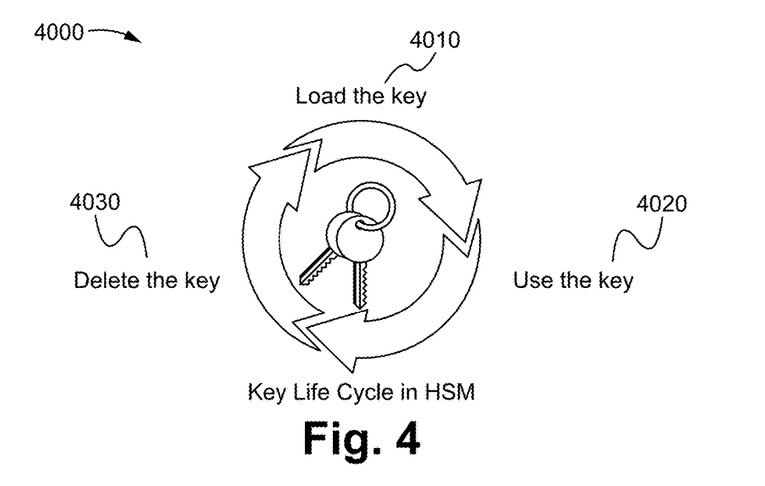
FIG. 4 shows the lifecycle of a signing key inside an HSM in accordance with one embodiment of the invention.

In one embodiment, once a key (i.e., cleartext key) has signed data in the HSM 1080, the key is deleted within a predetermined period within the HSM 1080. Thus, even if the HSM is compromised, a malicious attacker cannot access a signing key. FIG. 4 shows the phases of a lifecycle 4000 for a signing key for signing transaction data in the HSM 1080 in accordance with one embodiment of the invention.

Referring to FIGS. 1 and 4, in a phase 4010, the HSM 1080 imports the transaction data and the wrapped private key. In a second phase 4020, the HSM 1080 signs the transaction data with the cleartext private key and transmits the signed transaction data to the HSM Trusted Client 1070. Optionally, in a third phase 4030, after the HSM 1080 signs the transaction data and transmits the signed transaction data to the HSM Trusted Client 1070, the HSM 1080 deletes the private key within a predetermined period, such as immediately, 1 ms, 1 second, or any other suitable time period $T_{SMALL}$. In this way, even with the tamper-resistant HSM boundary, the cleartext private key exists in the HSM 1080 for only a minimal period, and in no event longer than the processing window (e.g., the width of the window B). Preferably, the phases 4010, 4020, and 4030 all occur within a single window B.

In some embodiments, the HSM 1080 is configured to retain some private keys for longer periods $T_{LARGE} > T_{SMALL}$ (or not to delete the keys at all) based on a user's profile and predetermined characteristics, such as when the private keys are used often (within predetermined time periods) and only for small transaction amounts (e.g., all less than a predetermined sum, such as $10USD). In this case, the private keys are considered associated with a "Hot Wallet" and are cached in the HSM 1080 to improve performance. As some examples $T_{LARGE}$=1 hour, 1 day, or one week, to name only a few examples. In some embodiments, a user's profile includes parameters such as the user's ID, a field (e.g., flag) indicating that the user opts to store her key for the duration $T_{LARGE}$, the duration $T_{LARGE}$, a transaction amount for triggering the longer-term storage, or any other suitable parameters. These parameters are merely illustrative. Those skilled in the art will recognize other parameters that can be stored in a user's profile instead of or in addition to those described here.

The policy of distinguishing a performance oriented "Hot Wallet" and a security-oriented "Cold Wallet" can be decided either automatically based on machine/deep learning analytics or simply selected by the user.

Figure 5:
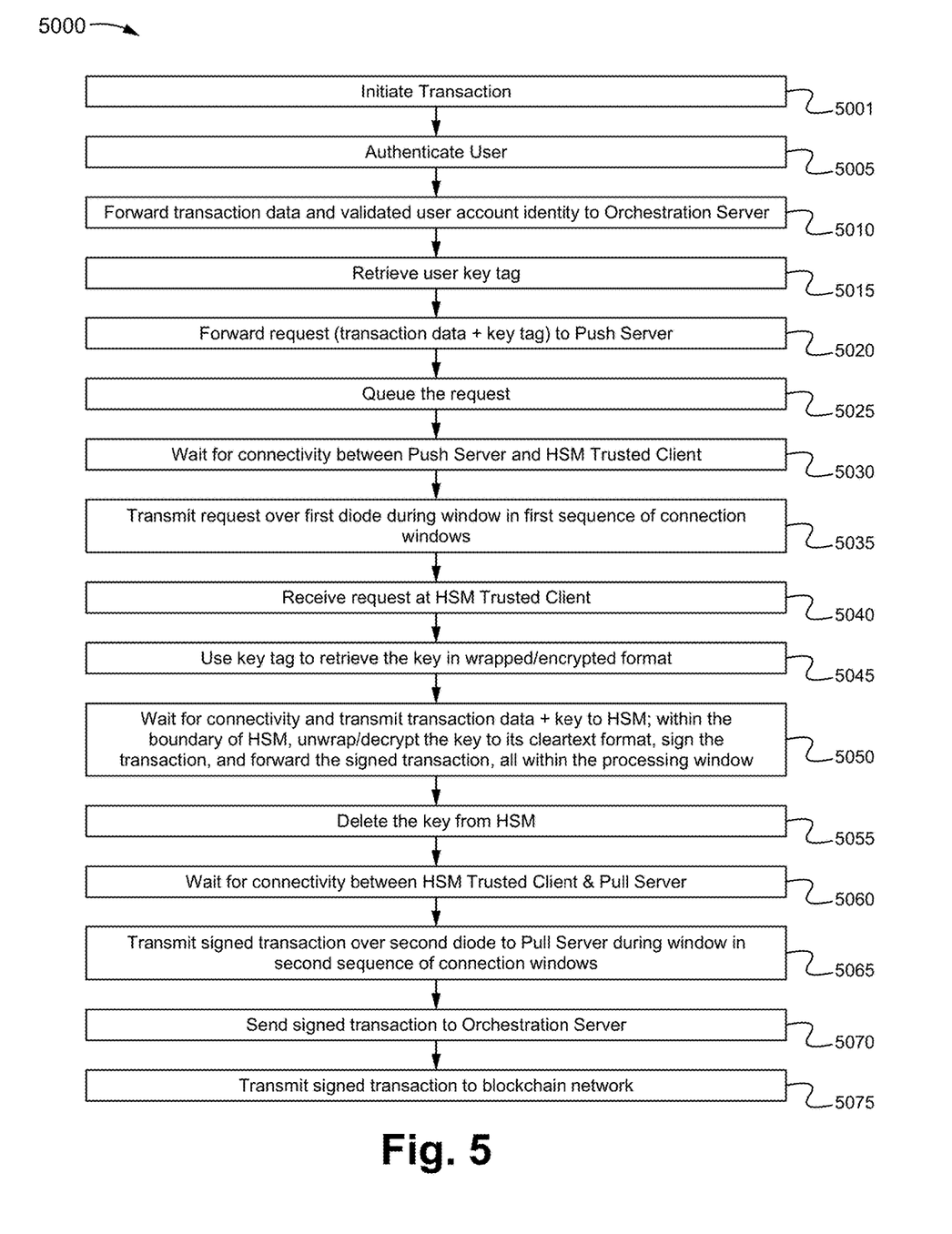
FIG. 5 shows the steps of a method of transmitting transaction data and key tags and signing the transaction data, all in accordance with one embodiment of the invention.

FIG. 5 shows the steps 5000 of a method of signing transaction data using the system 1000 in accordance with one embodiment of the invention. The system 1000 is referenced merely to explain the method and in no way limits the scope of the invention. In a step 5001, a user 1010 initiates a transaction to be made over a blockchain network 1015, such as paying money to another user's wallet or depositing money into his own wallet, to name only a few transactions. In a step 5005, the user is authenticated using the multi-authentication logic 1020. As one example, the user must be able to authenticate himself multiple times until his identity and transaction are both validated.

In a step 5010, the authenticated request, including the transaction data to sign and the user's validated account identity, is forwarded to the Orchestration Server 1030. The Orchestration Server 1030 is essentially a hub to orchestrate multiple operations to fulfill the original request. Next, in a step 5015, the Orchestration Server 1030 queries the user key-tag database 1025 to determine a key tag for the user based on the verified user identity.

Next, in a step 5020, the Orchestration Server 1030 forwards the transaction data and key tag (together, a "request") to the Push Server 1045 using a first transmission protocol, such as the TLS protocol. In a step 5025, the Push Server 1045 queues the request for transfer to the Wallet 1060. The Push Server 1045 is essentially a request queuing service for relaying the actual key signing data from the Orchestration Server 1030 to the HSM 1080. Preferably, the Push Server 1045 is trusted by the Orchestration Server 1030.

In the Data Center 1040, in a step 5030, the Push Server 1045 waits until its connectivity to the wallet 1060 is "UP," that is during a window in a first sequence of connection windows (e.g., any of the windows A in FIG. 2A). During a window A, in the step 5035, the Push Server 1045 transmits the request to the HSM Trusted Client 1070 unidirectionally over the first diode 1050A. It will be appreciated that data can only be sent to the HSM Trusted Client 1070 over the first diode 1050A and only during a window A. Any attempts to transmit data to the HSM 1080 over other channels or outside windows A are prevented. Data is transmitted from the Push Server 1045 over the first diode 1050A to the HSM Trusted Client 1070 using a second transmission protocol, such as UDP. UDP prevents a malicious actor from remotely controlling the Push Server 1045 and the associated HSM 1080.

In a step 5040, the HSM Trusted Client 1070 receives the request. Next, in a step 5045, the HSM Trusted Client 1070 uses the key tag to retrieve the encrypted private key from the Encrypted Key database 1065. The encrypted private key is encrypted using an HSM generated wrapping key. No one, not even the HSM operator, is able to decipher the private key in cleartext outside the security world boundary of the on-premises HSM 1080.

Next, in a step 5050, the HSM Trusted Client 1070 waits until the connectivity to the HSM 1080 is UP, that is, during a window in a sequence of processing windows (e.g., any of the windows B in FIG. 2A). During the window, the HSM Trusted Client 1070 transmits the transaction data and encrypted private key to the HSM 1080, where the HSM 1080 decrypts the private key to recover the cleartext signing key, signs the transaction data with the key, and transmits the signed transaction to the HSM Trusted Client 1070. In the optional step 5055, the HSM 1080 deletes the cleartext signing key. Alternatively, the HSM retains the signing key for future transactions. Next, in a step 5060, the HSM Trusted Client 1070 waits until the connectivity to the Pull Server 1090 is "UP," that is, during a window in a sequence of second connection windows (e.g., any of the windows C in FIG. 2A). In a step 5065, the HSM Trusted Client 1070 sends the signed transaction over the second diode 1050B to the Pull Server 1090. The second diode 1050B reinforces the unidirectional connection from the HSM Trusted Client 1070 to the Pull Server 1090, ensuring that a hacker cannot remotely control the HSM Trusted Client 1070 and its associated HSM 1080. Further, because the windows A, B, and C do not overlap, while the Pull Server 1090 pulls data from the wallet 1060, no signing (since this is outside the signing windows B) occurs in the wallet 1060.

Next, in a step 5070, the Pull Server 1090 forwards the signed transaction to the Orchestration Server 1030. In some embodiments, a multi-signature authorization is enforced using a multi-signature wallet. A multi-signature wallet is a wallet in which control over multiple private keys is required to spend from that wallet. In other words, an address in the wallet has multiple private keys behind it. The idea with multi-signature wallets is that multiple people or entities can cooperatively control the funds in the wallet. The "M" of "N" multi-signatures (where M s N, and M and N are both integers) can be implemented with "N" HSMs acting as controlling entities of which "M" signatures are required to process transactions.

In a multi-signature embodiment, the Orchestration Server 1090 will request another signature from a different HSM located in a different area of the on-premises HSM 1080. Multi-signature authorizations are described in U.S. patent application Ser. No. 16/733,045, filed Jan. 2, 2020, and titled "Apparatus and Methods for Remote Controlled Cold Storage of Digital Assets Using Near Field Communication Tags," incorporated by reference above. Alternatively or additionally, this multi-signature requirement is satisfied by one or more cloud HSMs 1005 from different vendors. Preferably, when using different HSMs for this multi-signature requirement, different operators are assigned to manage the different HSMs. This way, it is ensured that no one HSM operator has access to all the keys required for a transaction.

In a step 5075, once all the signatures are collected, the Orchestration Server 1090 pushes the signed transaction to any blockchain networks 1015 for the ledgering.

Figure 6:
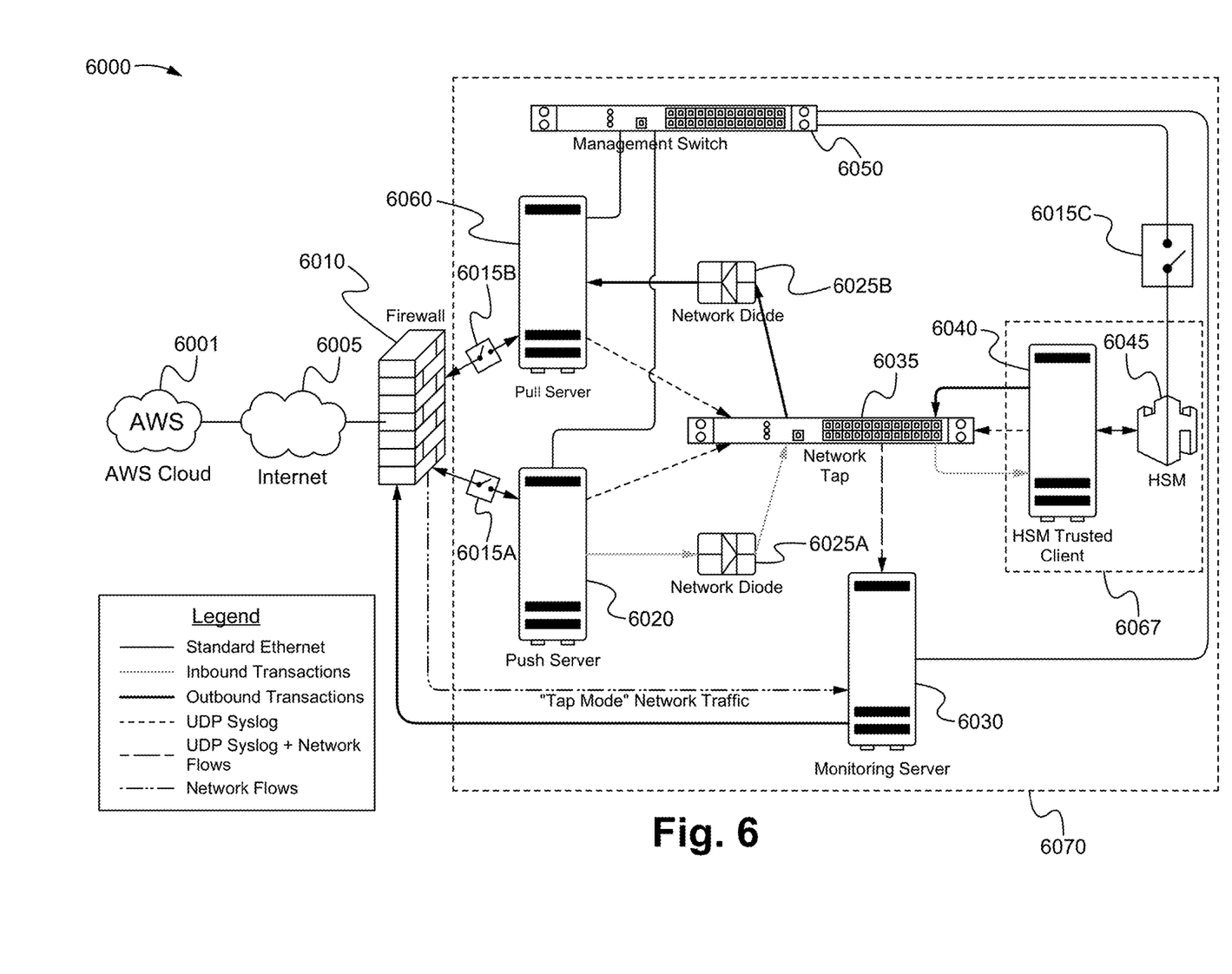
FIG. 6 is a high-level diagram of a firewall system for securely creating, storing, and using private keys for signing transactions in a network in accordance with one embodiment of the invention.

Other embodiments of the invention are adapted to provide additional security and to monitor transactions over a system such as the system 1000 in FIG. 1. FIG. 6 is a high-level diagram of a firewall system 6000 deployed in a network for securely signing transaction data in accordance with embodiments of the invention. The system 6000 includes components for monitoring traffic and other metrics, and for seamlessly inserting, removing, or switching components for ease of use, repair, replacement, etc.

The system 6000 includes an Amazon® Web Services (AWS) Cloud 6001 coupled to the Internet 6005. The AWS Cloud 6001 provides on-demand computing platforms and application programming interfaces for services. The Internet 6005 is coupled over a Firewall 6010 to a Data Center 6070. The Data Center 6070 includes first, second, and third switches 6015A-C, respectively, a Push Server 6020, a Pull Server 6060, first and second network diodes (i.e. one-way transmission elements) 6025A and 6025B, respectively, a Network Tap 6035, a Management Switch 6050, a Monitoring Server 6030, and a Digital Wallet 6067 that includes an HSM Trusted Client 6040 coupled over a two-way transmission path to an HSM 6045.

The Firewall 6010 is coupled to the first and second switches 6015A and 6015B, which allow the Firewall 6010 to be seamlessly connected and disconnected from the Push Server 6020 and the Pull Server 6060, respectively. The first network diode 6025A couples the Push Server 6020 over a one-way connection to the Network Tap 6035, and the second network diode 6025B couples the Network Tap 6035 over a one-way connection to the Pull Server 6060. The Push Server 6020 and the Pull Server 606 are also directly coupled to the Network Tap 6035 for transmitting UDP Syslog data. The Network Tap 6035 is coupled to the HSM Trusted Client 6040 to transmit inbound transactions to the HSM Trusted Client 6040, to receive UDP Syslog data from the HSM Trusted Client 6040, and to receive outbound transactions from the HSM Trusted Client 6040. The Management Switch 6050 is coupled to the Push Server 6020, the Pull Server 6060, the Monitoring Server 6030, and, over the third switch 6015C, to the HSM 6045.

The Monitoring Server 6030 is coupled to the Firewall 6010 to receive "Tap Mode" Network Traffic and to transmit outbound transactions. The Monitoring Server 6035 is also coupled to receive UDP Syslog+Network Flows from the Network Tap 6035.

Similar components of the system 6000 operate similarly to those of the system 1000. For example, the Pull Server 6020 and Push Server 6060 have the same or similar functionality as the Push Server 1045 and 1030, respectively; the first and second network diodes 6025A and 6025B have the same or similar functionality as the first and second diodes 1050A and 1050B; the HSM Trusted Client 6040 has the same or similar functionality as the HSM Trusted Client 1070; and the HSM 6045 has the same or similar functionality as the HSM 1080.

In operation, the Firewall 6010 offers additional security to the on-premises Data Center 6070. The first, second, and third switches 6015A-C and the Management Switch 6050 allow any of the components coupled to them (e.g., Push Server 5020, Pull Server 5060, HSM 6045 and Monitoring Server 5030) to be disconnected, preventing transmission of any data through the component. The Monitoring Server 6030 monitors network traffic and other metrics.

While the above examples describe using diodes, such as IGBT diodes, to form the one-way communication channels 1050A and 1050B, it will be appreciated that other embodiments use other one-way communication elements using other suitable transmission protocols. In different embodiments, the one-way communication channels each includes a laser coupled over an air gap to a photodiode, an ultrasound speaker coupled over an air gap to a matching microphone, or an NFC write module (e.g., tag) coupled over an air gap to an NFC read (e.g., active) module, to name only a few examples. For the embodiments incorporating ultrasound speaker/microphone pairs, the ultrasound is used to modulate information and pass the data along a path via a speaker across the air gap to an ultrasensitive microphone. Preferably, for each wireless embodiment, the air gap is shielded against eavesdroppers, such as with a light insulator (e.g., for the laser/photodiode pairs), a sound insulator (e.g., for the ultrasound speaker/microphone pairs), a magnetic shield (for the NFC read/write modules), or by any other suitable means. Air-Gapped Near-Field Communication Tags are described in U.S. patent application Ser. No. 16/733,045, incorporated by reference above.

In still another embodiment, the one-way communication channels incorporate steganographic means (e.g., coder/decoder), by which data is hidden/concealed in files, messages, images, or video, thereby hidden from potential eavesdroppers, and later recovered/extracted, as described below.

Figure 7A:
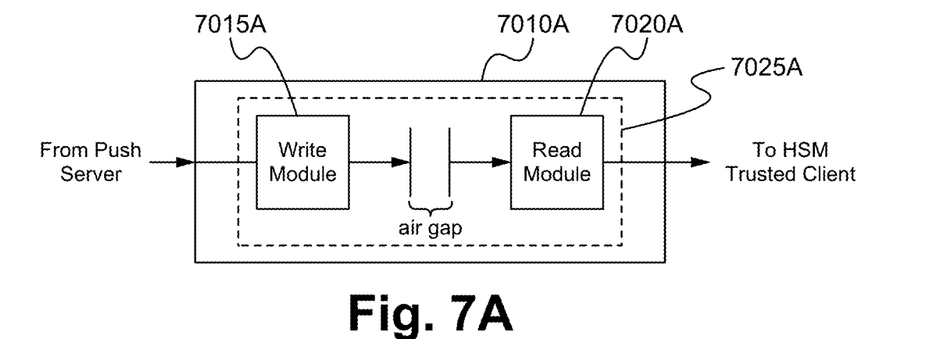
FIGS. 7A-B are block diagrams of one-way air-gapped communication channels in accordance with several embodiments of the invention.
Figure 7B:
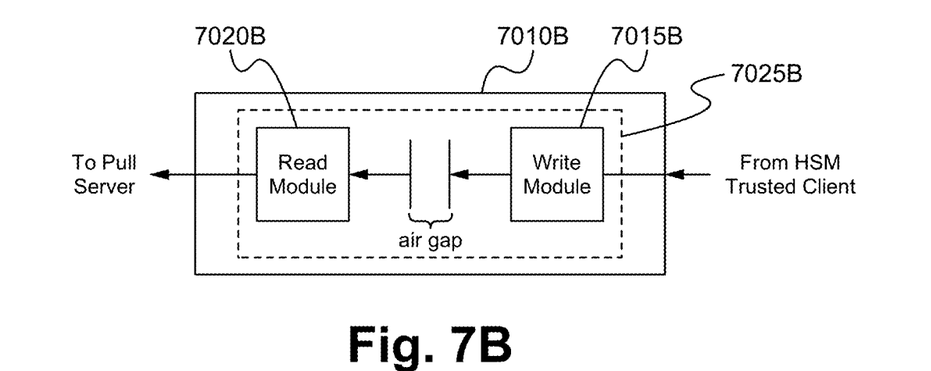

FIG. 7A, for example, shows a first wireless one-way communication channel 7010A for transmitting data from the Push Server 1045 to the HSM Trusted Client 1070, and FIG. 7B shows a second wireless one-way communication channel 7010B for transmitting data from the HSM Trusted Client 1070 to the Pull Server 1090. (To better illustrate the explanation, the descriptions refer to FIG. 1, in which the first diode 1050A is replaced by the first one-way communication channel 7010A, and the second diode 1050B is replaced by the second one-way communication channel 7010B.) The first channel 7010A includes a write module 7015A that receives data (e.g., transaction data and key tags) from the Push Server 1045 and transmits the data over an air-gap to a read module 7020A, which transmits the data to the HSM Trusted Client 1070. Similarly, the second channel 7010B includes a write module 7015B that receives data (e.g., a signed transaction) from the HSM Trusted Client 1070 and transmits the data over an air gap to the read module 7020B, which transmits the data to the Pull Server 1090.

In one embodiment, the write modules 7015A and 7015B each includes a laser or other light source and the read modules 7020A and 7020B each includes a paired/matched photodiode configured to read optical signals from the laser or light source. The paired modules 7015A/7020A and 7015B/7020B communicate using optical-signal protocols such as Synchronous Optical Networking (SONET), Synchronous Digital Hierarchy (SDH), and Optical Transport Network (OTN), to name only a few such protocols. In another embodiment, the write modules 7015A and 7015B each includes an ultrasound speaker and the read modules 7020A and 7020B beach includes an ultrasonic microphone. The write module 7015A for example modulates a signal containing data and its corresponding microphone 7020A demodulates the signal to recover the data. In yet another embodiment, the write modules 7015A and 7015B each includes an NFC tag and the read (e.g., active) modules 7020A and 7020B each includes circuitry for reading NFC tags. The paired modules 7015A/7020A and 7015B/7020B operate using an NFC protocol. In still another embodiment, the write modules 7015A and 7015B function using steganography by generating content (e.g., images) and hiding the data within the content. The matching read modules 7020A and 7020B, respectively, use specific algorithms to recover the hidden data.

Preferably, the air gaps in the transmission modules 7010A and 7010B are enclosed within shields 7025A and 7025B, respectively. Referring to the illustrative transmission module 7010A, when the read/write modules 7020A/7015A include light source/photodiode pairs, the shielding 7025A includes a light insulator. When the read/write modules 7020A/7015A include NFC read/write modules, the shielding 7025A includes magnetic/sound shielding. When the read/write modules 7020A/7015A include ultrasound speaker/microphone pairs, the shielding 7025A includes sound shielding.

After reading this disclosure, those skilled in the art will recognize other wired and wireless one-way communication channels in accordance with the invention.

In one embodiment, the HSMs employed in the embodiments described above are configured for Federal Information Processing Standard (FIPS) 140-2, which means that any attempt to steal the signing key from the HSM will be detected and the key will be zeroed out. It will be appreciated that HSMs in accordance with the embodiments can be configured to meet other security standards. Also, in accordance with the embodiments, the encrypted key is behind the cryptographic boundary. Thus, even if the encrypted key is inadvertently stolen, it cannot be used to recover the cleartext key. A hacker cannot recover the key from any other HSMs in the cloud of HSMs (e.g., 1005, FIG. 1), except for the original HSM that exports the key.

In operation of one embodiment, a multi-signed transaction from a user is associated with a key tag, which identifies the user's key for signing the transaction data. The key tag and transaction data are forwarded over a one-way communication channel only during discrete windows in a first sequence of connection windows, such as a pulse train, to a wallet that houses an HSM. Inside the wallet, the key tag is used to determine an encryption of the user's key. The transaction data and encrypted key are both forwarded to the HSM, where the encrypted key is decrypted to determine the cleartext key, the transaction data are signed with the signing (cleartext) key, the cleartext key is deleted, and the signed transaction is transmitted from the HSM, all during any one window within a sequence of processing windows. The signed transaction is pulled from the wallet during a second sequence of connection windows over a second one-way communication channel and later forwarded to a blockchain network. None of the first and second sequence of connection windows and the processing windows overlap. In some embodiments, multiple signatures are needed over a cloud of HSMs before the signed transaction is transmitted over the blockchain network.

Unlike cold wallets on the user/client side, which are slow, error prone, and susceptible to theft of user keys on USB-based devices such as Trevor, embodiments of the invention employ a cold wallet implementation at the server backend. These embodiments ensure that key storage and signing always occur offline. Security is further enhanced by diode paths and other one-way data transmission paths to ensure the mission critical level of security and safety assuming zero trust from the Internet. Because of the nature of this back-end implementation, automation is easy to implement, providing higher performance than prior art systems.

While the examples describe digital wallets storing digital currencies, it will be appreciated that other digital objects can be secured using the principles of the invention.

It will also be appreciated that while the examples describe transmitting transaction data, key tags, encrypted keys, and signed transactions, other data can also be transmitted in accordance with the principles of the invention, such as to provide increased functionality, security, or both, to name only a few examples.

It will also be appreciated that while some embodiments show separate components, components can be integrated. For example, referring to FIG. 7, the read/write module 7005 can be integrated with the HSM Trusted Client 1070, and the read/write module 7010 can be integrated with the HSM 1080.

It will be readily apparent to one skilled in the art that various other modifications may be made to the embodiments without departing from the spirit and scope of the invention as defined by the appended claims.

We claim:

1. A method of signing transaction data within a digital wallet, wherein the digital wallet comprises a hardware security module (HSM) Trusted Client coupled to a HSM, the method comprising:
    transmitting transaction data corresponding to a transaction and an encrypted key to the HSM Trusted Client over a first one-way transmission path;
    processing the transaction data within the digital wallet, wherein the processing comprises:
        transmitting the transaction data and the encrypted key from the HSM Trusted Client to the HSM along a two-way transmission path;
        inside the HSM, using the encrypted key to recover a signing key and signing the transaction data with the signing key to generate a signed transaction; and
        transmitting the signed transaction from the HSM to the HSM Trusted Client over the two-way transmission path; and
    transmitting the signed transaction from the HSM Trusted Client over a second one-way transmission path for transmission to a blockchain network,
    wherein each transaction data and signed transaction is only transmitted between the blockchain network and the digital wallet over the first and second one-way transmission paths, and none of transmitting data over the first one-way transmission path, processing data within the digital wallet, and transmitting data over the second one-way transmission path overlap;
    wherein transmitting data over the first one-way transmission path occurs only during a window in a first sequence of windows, processing data inside the digital wallet occurs only during a window in a second sequence of windows, and transmitting data along the second one-way transmission path occurs only during a window in a third sequence of windows, wherein none of the windows in the first, second, and third sequences of windows overlap.

2. The method of claim 1, wherein each of the first, second, and third sequences of windows comprises a corresponding pulse train.

3. The method of claim 2, wherein in each of the pulse trains the windows have a constant width and the period is constant.

4. The method of claim 2, wherein at least some of the windows have varying widths, at least some of the pulse trains have varying periods, or both.

5. The method of claim 1, wherein transmitting data over the first and second transmission paths is according to a one-way transmission protocol comprising user datagram protocol (UDP), a serial communication protocol, near-field communication protocol, an optical-signal protocol, an ultrasonic signal protocol, a steganographic protocol, or any combination thereof.

6. The method of claim 5, wherein at least a portion of both the first and second transmission paths is sound insulated, light shielded, magnetically shielded, or a combination thereof.

7. The method of claim 1, further comprising:
    receiving a request for the transaction from a user;
    associating the user with a key tag identifying the key;
    transmitting the transaction data and the key tag to the digital wallet over the first transmission path; and
    inside the digital wallet, using the key tag to determine an encrypted key.

8. The method of claim 7, further comprising periodically updating a mapping between the key tag and the encryption key.

9. The method of claim 7, further comprising:
    decrypting the encrypted key within the HSM to recover the signing key for signing the transaction data.

10. The method of claim 9, further comprising after signing the transaction with the signing key, deleting the signing key within the HSM within a period based on a profile for the user and one or more characteristics of the transaction.

11. The method of claim 10, wherein the one or more characteristics comprise an amount of the transaction and a period during which the user has requested transactions for amounts within a predetermined range.

12. The method of claim 10, wherein deletion is determined by machine learning.

13. The method of claim 7, wherein the key tag comprises a hash of the encrypted key.

14. The method of claim 7, wherein the key tag comprises an index into a table mapping the key tag to the encrypted key.

15. The method of claim 1, further comprising transmitting data over the first and second transmission paths according to transport layer security (TLS) protocol.

16. The method of claim 1, further comprising authenticating the transaction before transmitting the transaction data to the digital wallet.

17. The method of claim 16, wherein authenticating the transaction comprises receiving signatures for the transaction from at least a quorum of users on the blockchain network.

18. The method of claim 1, wherein the transaction is one of multiple transactions each having corresponding transaction data, and
wherein at least two of the multiple transaction data are transmitted over the first one-way transmission path together, at least two of the multiple signed transactions are transmitted over the second one-way transmission path together, or both.

19. The method of claim 18, wherein at least two of the multiple transaction data are processed in a batch, when the first and second one-way transmission paths are disconnected.

20. A system for securely signing transactions for transmission over a blockchain network comprising:
a digital wallet comprising a hardware security module (HSM) Trusted Client coupled to a HSM comprising a memory, the HSM configured to sign a transaction, wherein the digital wallet is configured to process transaction data corresponding to the transaction, processing transaction data comprising:
transmitting the transaction data and an encrypted key from the HSM Trusted Client to the HSM;
inside the HSM, using the encrypted key to recover a signing key and signing the transaction data with the signing key to generate a signed transaction; and
transmitting the signed transaction from the HSM to the HSM Trusted Client;
a first transmission module providing one-way transmission for the transaction data and a key tag corresponding to the encrypted key, to the HSM Trusted Client;
a second transmission module providing one-way transmission for the signed transaction from the HSM Trusted for later distribution to the blockchain network; and
a windows generator for generating nonoverlapping windows during which the processing inside the digital wallet, and the data transmission over the first and second one-way transmission paths, occur,
wherein the digital wallet is configured to receive data from the Internet only over the first transmission module and to transmit data to the blockchain network only over the second transmission module, and none of transmitting data over the first one-way transmission path, processing transaction data, and transmitting data over the second one-way transmission path overlap.

21. The system of claim 20, further comprising:
an orchestration server;
a user key tag database mapping users to corresponding key tags, wherein each of the user key tags uniquely identifies a user key;
a push server coupling the orchestration server to the first transmission module; and
a pull server coupling the second transmission module to the orchestration server.

22. The system of claim 21, wherein the orchestration server transmits transaction data and corresponding user key tags to the push server, receives signed transactions from the pull server, and transmits the signed transactions to the blockchain network.

23. The system of claim 22, wherein the orchestration server exchanges data with the push server and the pull server according to transport layer security protocol.

24. The system of claim 20, wherein the first and second transmission modules comprise, respectively, first and second diode elements.

25. The system of claim 20, wherein the first and second transmission modules comprise first and second light source-photodiode pairs, first and second NFC read/write pairs, first and second ultrasonic speaker/microphone pairs, or any combination thereof.

26. The system of claim 25, wherein the first and second transmission modules each comprises a shielded air gap over which data is transmitted.

27. The system of claim 20, wherein data transmission from the push server to the HSM Trusted Client and from the HSM Trusted Client to the pull server is according to a one-way transmission protocol.

28. The system of claim 27, wherein the one-way transmission protocol comprises user datagram protocol, NFC protocol, an optical signal protocol, an ultrasonic protocol, or any combination thereof.

29. The system of claim 20, wherein the first and second transmission modules each comprises a steganographic embedder/extractor.

30. The system of claim 20, wherein the digital wallet further comprises an encrypted key database that maps key tags to associated encrypted keys.

31. The system of claim 30, wherein each of the keys tags in the encrypted key database comprises a hash of its associated encrypted key.

32. The system of claim 20, further comprising:
multi-authentication logic coupled to the orchestration server, the multi-authentication logic configured to authenticate a transaction from a user using signatures from multiple users.

33. The system of claim 32, wherein the orchestration server is further coupled to a cloud HSM.

34. The system of claim 20, wherein the HSM Trusted Client is configured to queue multiple transaction requests each corresponding to a transaction data.

35. The system of claim 34, wherein the HSM is configured to process the multiple transaction requests as a batch.

36. A system for securely signing transactions for transmission over a blockchain network comprising:
a digital wallet comprising:
a hardware security module (HSM) Trusted Client;
a HSM coupled to the HSM Trusted Client; and
an encrypted key database, wherein the digital wallet is configured to process transaction data corresponding to the transaction, processing transaction data comprising:
    transmitting the transaction data and an encrypted key from the HSM Trusted Client to the HSM;
    inside the HSM, using the encrypted key to recover a signing key and signing the transaction data with the signing key to generate a signed transaction; and
    transmitting the signed transaction from the HSM to the HSM Trusted Client,
    wherein the RSM Trusted Client is configured to queue multiple transaction requests each corresponding to transaction data, and the HSM is configured to process the multiple transaction requests as a batch;
a push server comprising a hardware processor and memory;
a pull server comprising a hardware processor and memory;
a first transmission module providing one-way transmission from the HSM Trusted Client to the pull server;
a second transmission module providing one-way transmission from the push server to the HSM Trusted Client,
wherein the digital wallet is configured to receive data from the Internet only over the first transmission module and to transmit data to the blockchain networks only over the second transmission module;
multi-authentication logic configured to authenticate a transaction from a user using signatures from multiple users;
a user key tag database mapping users to corresponding key tags, wherein each of the user key tags uniquely identifies a user key;
an orchestration server coupled to the multi-authentication logic, the user key tag database, the push server, the pull server, blockchain networks, and a cloud HSM; and
a windows generator for generating non-overlapping windows during which processing transaction data within the digital wallet, transmission along the first transmission path, and transmission along the second transmission path occur.

* * * * *